United States Patent
Alpert

(10) Patent No.: US 9,442,686 B2
(45) Date of Patent: Sep. 13, 2016

(54) ELECTRONIC DEVICE AND METHOD OF CONTROLLING DISPLAY OF INFORMATION

(71) Applicant: BlackBerry Limited, Waterloo (CA)

(72) Inventor: Alan James Alpert, Redwood City, CA (US)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 14/555,406

(22) Filed: Nov. 26, 2014

(65) Prior Publication Data
US 2016/0147495 A1    May 26, 2016

(51) Int. Cl.
G06F 3/14       (2006.01)
G06F 3/0481     (2013.01)
G06F 3/0482     (2013.01)

(52) U.S. Cl.
CPC .......... G06F 3/1446 (2013.01); G06F 3/0482 (2013.01); G06F 3/04817 (2013.01)

(58) Field of Classification Search
CPC . G06F 3/1446; G06F 3/0482; G06F 3/04817
See application file for complete search history.

(56) References Cited

U.S. PATENT DOCUMENTS

| | | | | |
|---|---|---|---|---|
| 6,603,493 B1* | 8/2003 | Lovell | ............ | G06F 9/4443 345/660 |
| 2009/0327965 A1* | 12/2009 | Averett | ............ | G06F 3/04842 715/835 |
| 2010/0070931 A1* | 3/2010 | Nichols | ............ | G06F 3/0488 715/863 |
| 2013/0057587 A1* | 3/2013 | Leonard | ............ | G06F 3/0488 345/660 |
| 2013/0305187 A1* | 11/2013 | Phillips | ............ | G06F 3/04817 715/800 |
| 2014/0245148 A1* | 8/2014 | Silva | ............ | H04N 5/44591 715/719 |
| 2014/0337747 A1* | 11/2014 | Koon | ............ | H04L 67/025 715/740 |
| 2015/0007078 A1* | 1/2015 | Feng | ............ | G06F 3/0484 715/771 |

OTHER PUBLICATIONS

Duffy, Jill, Get Organized: Tips for Arranging Windows 8 Tiles, Feb. 4th, 2013.*
"Rearranging tiles on start", Microsoft.*

* cited by examiner

*Primary Examiner* — Dennis Joseph
(74) *Attorney, Agent, or Firm* — Borden Ladner Gervais LLP; Geoffrey deKleine

(57) ABSTRACT

A method of controlling display of information arranged in tiles on a display includes arranging the tiles in rows by setting a height of each row to a largest minimum height of the tiles of that row, receiving selections of a first group of tiles in a first row and a second group of tiles in a second row. In response to determining that the first group width is equal to the second group width, the groups are exchanged by moving the first group of tiles to the second row and the second group of tiles to the first row. A new height of the first row and a new height of the second row are set. In response to determining that the first group width differs from the second group width, an adjacent tile is added to the one of the first group and the second group that has a smaller width.

19 Claims, 5 Drawing Sheets

ELECTRONIC DEVICE AND METHOD OF CONTROLLING DISPLAY OF INFORMATION

FIELD OF TECHNOLOGY

The present disclosure relates to electronic devices including, but not limited to, portable electronic devices and controlling the display of information.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Handheld devices are relatively small and have limited space for user input and output.

Tiles are suitable for displaying information such as icons or widgets on a display and such tiles facilitate the use of a large percentage of the display for such information. Tiles may be displayed in various sizes to accommodate the display of the widget or icon information within the associated tile.

Improvements in electronic devices and the display of information are desirable.

BRIEF DESCRIPTION OF THE DRAWINGS

Embodiments of the present disclosure will now be described, by way of example only, with reference to the attached figures, in which.

DETAILED DESCRIPTION

Figure 1:
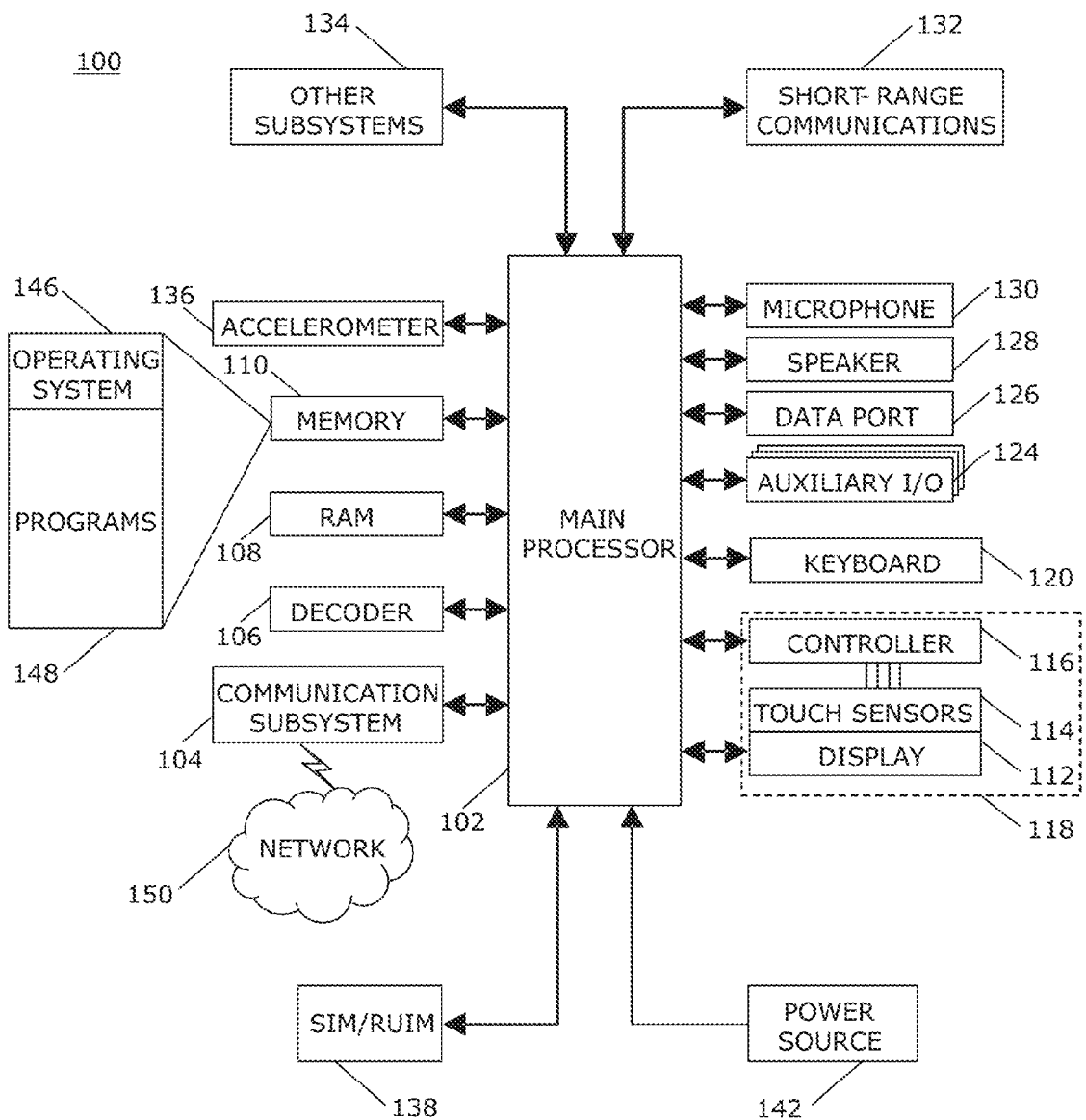
FIG. 1 is a block diagram of an example of a portable electronic device in accordance with the disclosure.

The following describes an electronic device and a method of controlling display of information arranged in tiles on an electronic device, each tile having associated minimum height. The method includes arranging the tiles in a plurality of rows by setting a height of each row equal a largest minimum height associated with the tiles of that row, receiving a selection of a first group of tiles in a first row of the plurality of rows, receiving a selection of a second group of tiles in a second row of the plurality of rows, and comparing a first group width with a second group width. In response to determining that the first group width is equal to the second group width, rearranging the tiles by exchanging the first group of tiles with the second group of tiles by moving the first group of tiles to the second row and the second group of tiles to the first row, a new height of the first row is set to a largest minimum height associated with the tiles in the first row, and a new height of the second row is set to a largest minimum height associated with the tiles in the second row. In response to determining that the first group width differs from the second group width, an adjacent tile from an associated row is automatically adding to one of the first group of tiles and the second group of tiles having a smaller width.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, one or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
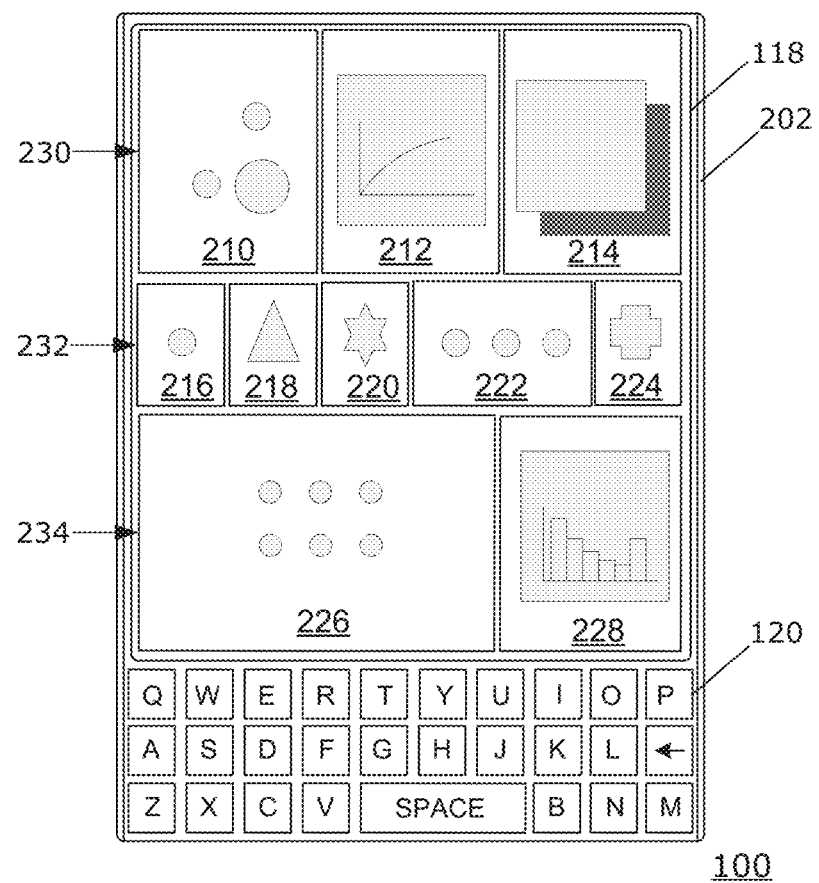
FIG. 2 is a front view of an example of a portable electronic device including information arranged in tiles arranged on a display thereof in accordance with the disclosure.

An example of an electronic device 100 is shown in FIG. 2. In the example of FIG. 2, the electronic device 100 includes a housing 202 in which the touch-sensitive display 118 is disposed. The housing 202 is utilized to enclose components such as the components shown in FIG. 1. The keyboard 120 is disposed below the touch-sensitive display 118 in the orientation illustrated in FIG. 2.

For the purpose of the example of FIG. 2, information 204 is displayed in tiles 210, 212, 214, 216, 218, 220, 222, 224, 226, 228 on the touch-sensitive display 118 of the electronic device 100. The tiles 210, 212, 214, 216, 218, 220, 222, 224, 226, 228 may be displayed, for example, as a home screen of the electronic device 100, or in response to receipt of a selection to display the tiles. The information may be any suitable information. For example, the information may be icons for selection of an application and related information, documents stored or available from the electronic device 100, webpages that are bookmarked or frequently accessed, widgets, for display of information such as electronic device status information, sports scores or related information, weather reports, flight status, any other suitable information and any suitable combination of such information.

In this example, 10 tiles 210, 212, 214, 216, 218, 220, 222, 224, 226, 228 are displayed on the touch-sensitive display 118 of the electronic device 100. Each tile is associated with a minimum height. The minimum height may be a height, in pixels, that is utilized to display the tile. Each tile may be displayed at a height that exceeds the minimum height but is constrained in displayed height such that the displayed height is not less than the associated minimum height. Thus, the tiles may be displayed at a height that is equal to or greater than the associated minimum height.

The tiles are arranged in rows. In this example, three rows 230, 232, 234 of tiles are displayed. The upper row 230 includes three tiles 210, 212, 214. The middle row 232 includes five tiles 216, 218, 220, 222, 224, and the lower row 234 includes two tiles 226, 228.

The tiles in each row 230, 232, 234 are displayed at a height that is equal to the largest associated minimum height of each of the tiles in the row 230, 232, 234. For example, if the minimum height of the tile 212 is greater than the minimum height of the remaining tiles 210, 214 in the upper row 230, the row height of the upper row 230 is set to equal the minimum height of the tile 212 of that row. Thus, all tiles 210, 212, 214 of the upper row are displayed at a height that is equal to the associated minimum height of the tile 212. Similarly, the row height of the middle row 232 is set to the greatest minimum height associated with the tiles 216, 218, 220, 222, 224 of the middle row and the row height of the lower row 234 is set to the greatest minimum height associated with the tiles 226, 228 of the lower row 234.

The terms upper and lower are utilized herein to refer to the location of rows relative to the orientation of the electronic device 100 illustrated in FIG. 2 and are not otherwise limiting.

The displayed width of the tiles 210, 212, 214, 216, 218, 220, 222, 224, 226, 228 may be a set width that does not change. Alternatively, the displayed width may depend on the displayed height of the tile. The width of tiles may be constrained such that the width of any one tile is, for example, 1 unit, 2 units, or 4 units wide. The information displayed may change with a change in height or width or may be consistent, regardless of changes in the tile dimensions.

Figure 3:
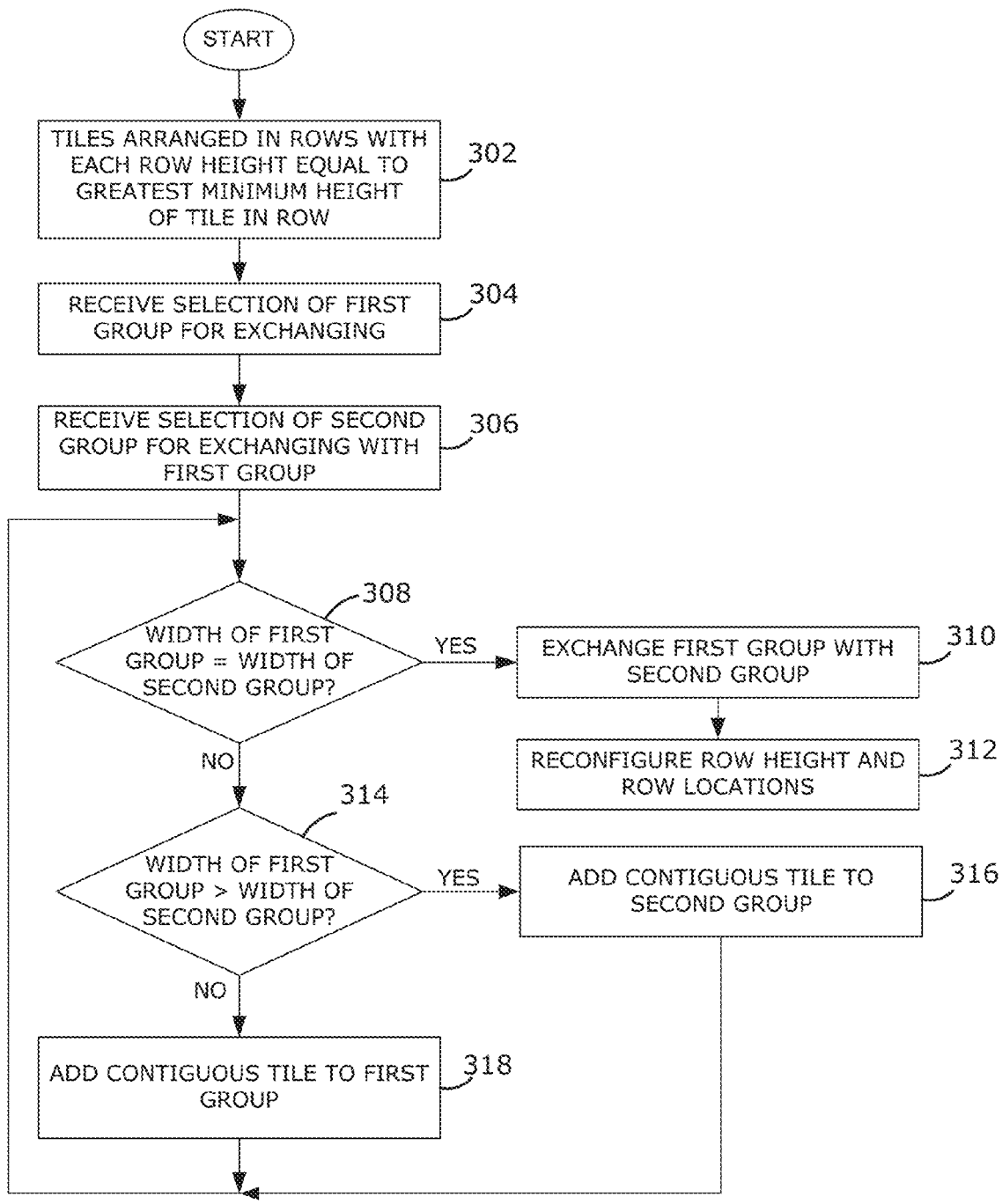
FIG. 3 is a flowchart illustrating a method of controlling display of information on the portable electronic device of FIG. 1 in accordance with the disclosure.

A flowchart illustrating a method of controlling display of information on an electronic device is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the electronic device to perform the method may be stored in a computer-readable storage medium, such as a non-transitory computer-readable medium.

Information is displayed in tiles that are arranged in rows at 302 on the touch-sensitive display 118. The pixel height of each row is set to the largest or greatest of the minimum heights associated with the tiles of the row. Thus, the pixel height of any row is not smaller than any of the minimum heights associated with the elements of that row.

A selection of a first group of tiles is received at the electronic device at 304. The selection of the first group of tiles may be a selection of a single tile or a selection of multiple tiles from a first row, which may be any row of displayed tiles. Thus, the first group of tiles may include one or more tiles from a single row. The first group of tiles may include all of the tiles from a single row. The tiles may be selected by a touch event on the touch-sensitive display 118. The touch event may be a single touch or a multi-touch event in which two fingers touch the touch-sensitive display 118 at the same or about the same time, for example, to select multiple tiles. Alternatively, the tiles may be selected utilizing a navigation device to control a navigation indicator, such as a cursor or highlighter. Suitable navigation devices may include, for example, a track pad, an optical joystick, a mouse, a scroll wheel or ball or any other suitable navigation device.

A selection of a second group of tiles is received at the electronic device at 306. The selection of the second group of tiles may be a selection of a single tile or a selection of multiple tiles from a second row, which may be any row of displayed tiles, other than the first row. Thus, the second group of tiles may include one or more tiles from a single row. The first group of tiles may include all of the tiles from a single row. The tiles may be selected by a touch event on the touch-sensitive display 118. The tiles that are selected may be selected by, for example, a dragging operation in which the touch event utilized to select the first group of tiles at 304 is dragged to another row and the tile or tiles associated with the end location of the touch event are selected. In this example, the tiles that are displayed at the end location or locations of the touch event are the second group of tiles that are selected for exchanging with the first group of tiles. Alternatively, the tiles may be selected by a separate single touch or multi-touch event, or utilizing a navigation device.

The width of the tiles of the first group is compared with the width of the tiles of second group to determine if the width of the first group is equal to the width of the second group at 308. In response to determining that the width of the first group is equal to the width of the second group at 308, the process continues at 310 and the first group of tiles and the second group of tiles are exchanged at 310. The first group of tiles and the second group of tiles are exchanged by moving the first group of tiles from the first row, from which the first group of tiles was selected, to the second row, from which the second group of tiles was selected. The second group of tiles is moved from the second row, from which the second group of tiles was selected, to the first row, from which the first group of tiles was selected. Thus, the first group of tiles and the second group of tiles are moved to exchange places in rows.

The height of the first row and the second row and the row locations are reconfigured at 312. The height of the first row is determined by identifying the largest or greatest of the minimum heights associated with the tiles of the first row, which now includes the second group of tiles and not the first group of tiles. The pixel height of the first row is then set to the greatest minimum height associated with the tiles and the tile height of each tile in the first row is set to the row height. Other rows of tiles may be moved up or down to accommodate the new height of the first row of tiles. For example, subsequent rows are shifted down when the first row is set to a greater pixel height after the exchange of the first group of tiles with the second group of tiles. Alternatively, subsequent rows are shifted up when the first row is set to a smaller or lesser pixel height after the exchange of the first group of tiles with the second group of tiles.

The height of the second row is determined by identifying the largest or greatest of the minimum heights associated with the tiles of the second row, which now includes the first group of tiles and not the second group of tiles. The pixel height of the second row is then set to the greatest minimum height associated with the tiles and the tile height of each tile in the second row is set to the row height. Other rows of tiles may be moved up or down to accommodate the new height of the second row of tiles.

In response to determining that the width of the first group of tiles is not equal to the width of the second group of tiles at 308, the process continues at 314. In response to determining that the width of the first group of tiles is greater than the width of the second group of tiles at 314, the process continues at 316. At 316, a tile that is contiguous with the second group of tiles is automatically added to the second group of tiles. Thus, a tile that is in the second row of tiles and is immediately adjacent the second group of tiles is added to the second group of tiles to increase the width of the second group of tiles. In one example, the tile that is added is the tile immediately adjacent on the right side of the second group of tiles in the orientation illustrated in FIG. 2. When no further tiles exist on the right side, the tile immediately adjacent on the left side of the second group of tiles is added to the second group of tiles. The process continues at 308 and the process of comparing the width of the tiles of the first group with the width of the tiles of second group and so forth is repeated.

In response to determining that the width of the first group of tiles is not greater than, i.e., is less than the width of the second group of tiles at 314, the process continues at 318. At 318, a tile that is contiguous with the first group of tiles is automatically added to the first group of tiles. Thus, a tile that is in the first row of tiles and is immediately adjacent the first group of tiles is added to the first group of tiles to increase the width of the first group of tiles. In one example, the tile that is added is the tile immediately adjacent on the right side of the first group of tiles in the orientation illustrated in FIG. 2. When no further tiles exist on the right side, the tile immediately adjacent on the left side of the first group of tiles is added to the first group of tiles. The process continues at 308.

Examples of displayed information and control of the displayed information are shown in FIG. 4 through FIG. 9. In the examples of FIG. 4 through FIG. 9, the touch-sensitive display 118 and the 10 tiles 210, 212, 214, 216, 218, 220, 222, 224, 226, 228 illustrated in FIG. 2 are shown.

As described above with reference to FIG. 2, three rows 230, 232, 234 of tiles are displayed at 302. The upper row 230 includes three tiles 210, 212, 214. The middle row 232 includes five tiles 216, 218, 220, 222, 224, and the lower row 234 includes two tiles 226, 228. The tiles in each row 230, 232, 234 are displayed at a height that is equal to the largest associated minimum height of each of the tiles in the row 230, 232, 234.

Figure 4:
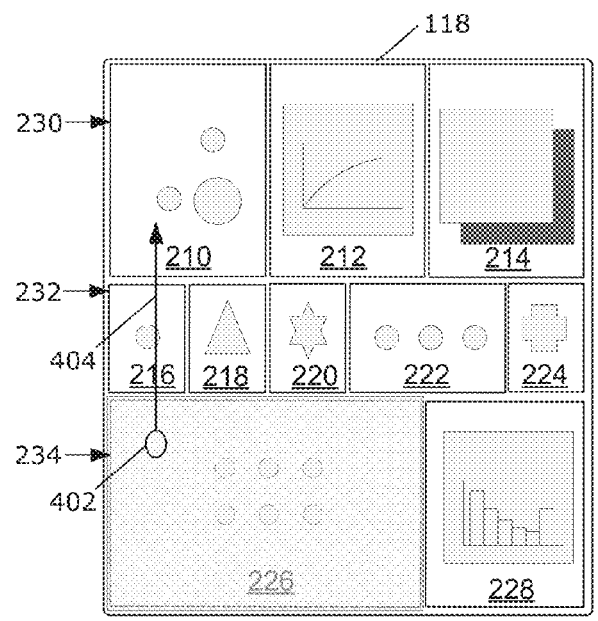
FIG. 4 through FIG. 9 illustrate examples of displayed information and control of the displayed information in accordance with the flowchart of FIG. 3.
Figure 5:
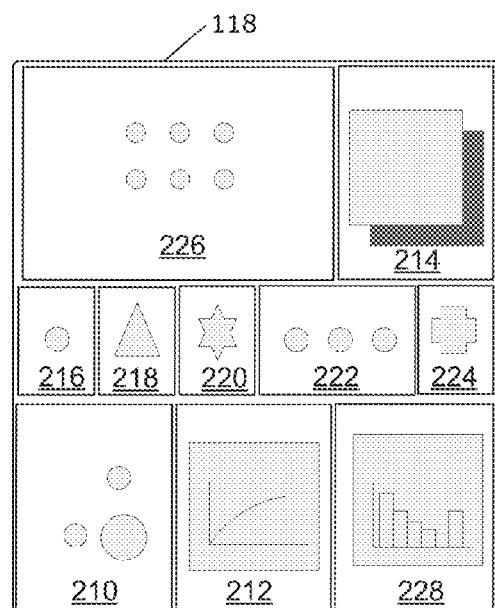

In the example of FIG. 4 and FIG. 5, a touch and drag is detected on the touch-sensitive display 118. The touch is illustrated by the ellipse 402 and the dragging motion is illustrated by the arrow 404 in FIG. 4. The touch ends at the end of the arrow 404. The touch begins on the tile 226, selecting the first tile 226 for exchanging at 304. The touch ends on the tile 210, selecting the tile 210 for exchanging with the tile 226 at 306. The width of the tile 226 is greater than the width of the tile 210. Thus, the process continues from 308 to 314 and then to 316 where, in response to determining that the width of the tile 226 is greater than the width of the tile 210, the contiguous tile 212 is added to the second group, which, after adding the tile 212 includes both the tile 210 and the tile 212. The process continues at 308 and, in response to determining that the width of the first group is now equal to the width of the second group at 308, the first group is exchanged with the second group at 310, as illustrated in FIG. 5.

The first group of tiles, which includes the tile 226, and the second group of tiles, which includes the tiles 210 and 212 are exchanged by moving the first group of tiles from the lower row, from which the first group of tiles was selected, to the upper row, from which the second group of tiles was selected. The second group of tiles is moved from the upper row, from which the second group of tiles was selected, to the lower row, from which the first group of tiles was selected. Thus, the first group of tiles and the second group of tiles exchange rows.

The height of the upper row and the lower row and the row locations are reconfigured at 312 by identifying the largest or greatest of the minimum heights associated with the tiles of the upper row, which now includes the tile 226. The pixel height of the upper row is then set to the greatest minimum height associated with the tiles 226, 214. The height of the lower row is also reconfigured by identifying the largest of the minimum heights associated with the tiles of the lower row, which now includes the tiles 210 and 212. The pixel height of the lower row is then set to the greatest minimum height associated with the tiles 210, 212, 228.

Figure 6:
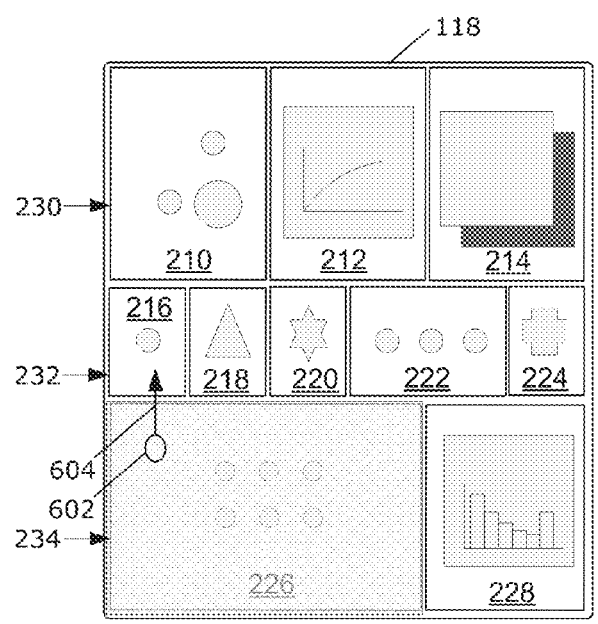
Figure 7:
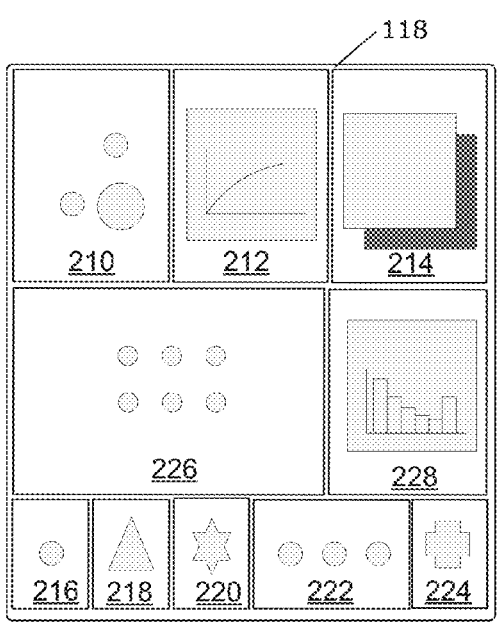

In the example of FIG. 6 and FIG. 7, a touch and drag is detected on the touch-sensitive display 118. The touch is illustrated by the ellipse 602 and the dragging motion is illustrated by the arrow 604 in FIG. 6. The touch ends at the end of the arrow 604. The touch begins on the tile 226, selecting the first tile 226 for exchanging at 304. The touch ends on the tile 216, selecting the tile 216 for exchanging with the tile 226 at 306. The width of the tile 226 is greater than the width of the tile 216. Thus, the process continues from 308 to 314 and then to 316 where, in response to determining that the width of the tile 226 is greater than the width of the tile 216, the contiguous tile 218 is added to the second group, which, after adding the tile 218 includes both the tile 216 and the tile 218.

The process is repeated and the width of the first group of tiles is still greater than the second group of tiles. In response to determining that the width of the tile 226 is greater than the width of the tiles 216 and 218, the contiguous tile 220 is added to the second group, which, after adding the tile 220 includes the tiles 216, 218, and 220.

The process is repeated and the width of the first group of tiles is still greater than the second group of tiles. In response to determining that the width of the tile 226 is greater than the width of the tiles 216, 218, and 220, the contiguous tile 222 is added to the second group, which, after adding the tile 222 includes the tiles 216, 218, 220, and 222.

The process is repeated and the width of the first group of tiles is now less than the width of the second group of tiles. In response to determining that the width of the tile 226 is not equal to and is not greater than the width of the tiles 216, 218, 220, 222, the contiguous tile 228 is added to the first group, which, after adding the tile 228 includes all the tiles 226, 228 in the lower row.

The process is repeated and the width of the first group of tiles is greater than the second group of tiles. In response to determining that the width of the tiles 226 and 228 is greater than the width of the tiles 216, 218, 220, and 222, the contiguous tile 224 is added to the second group, which, after adding the tile 224 includes all the tiles 216, 218, 220, 222, 224 in the middle row.

The process continues at 308 and, in response to determining that the width of the first group is now equal to the width of the second group at 308, the first group is exchanged with the second group at 310, as illustrated in FIG. 7.

The first group of tiles, which includes the tiles 226, 228, and the second group of tiles, which includes the tiles 216, 218, 220, 222, 224 are exchanged by moving the first group of tiles from the lower row, from which the first group of tiles was selected, to the middle row, from which the second group of tiles was selected. The second group of tiles is moved from the middle row, from which the second group of tiles was selected, to the lower row, from which the first group of tiles was selected. Thus, the first group of tiles and the second group of tiles exchange rows.

The height of the middle row and the lower row and the row locations are reconfigured at 312 by identifying the largest of the minimum heights associated with the tiles of the middle row, which now includes the tiles 226, 228. The pixel height of the middle row is then set to the greatest minimum height associated with the tiles 226, 228. The height of the lower row is also reconfigured by identifying the largest of the minimum heights associated with the tiles of the lower row, which now includes the tiles 216, 218, 220, 222, 224. The pixel height of the lower row is then set to the greatest minimum height associated with the tiles 216, 218, 220, 222, 224.

Figure 8:
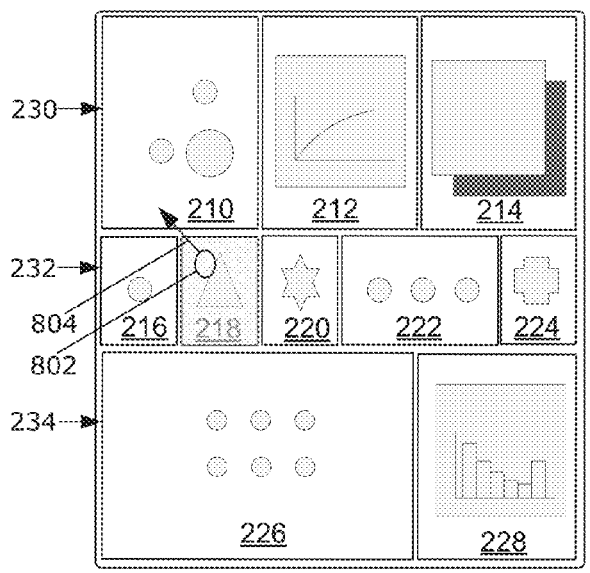
Figure 9:
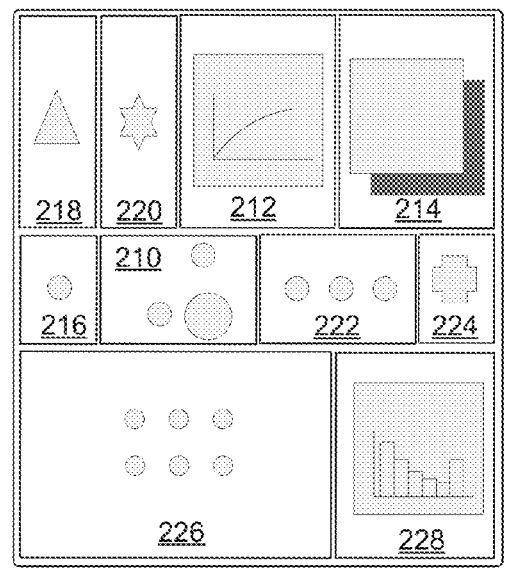

In the example of FIG. 8 and FIG. 9, a touch and drag is detected on the touch-sensitive display 118. The touch is illustrated by the ellipse 802 and the dragging motion is illustrated by the arrow 804 in FIG. 8. The touch ends at the end of the arrow 804. The touch begins on the tile 218, selecting the first tile 218 for exchanging at 304. The touch ends on the tile 210, selecting the tile 210 for exchanging with the tile 218 at 306. The width of the tile 218 is less than the width of the tile 210. Thus, the process continues from 308 to 314 and then to 318 where, in response to determining that the width of the tile 218 is not greater than the width of the tile 210, the contiguous tile 220 is added to the first group, which, after adding the tile 220 includes both the tile 218 and the tile 220. The process continues at 308 and, in response to determining that the width of the first group is now equal to the width of the second group at 308, the first group is exchanged with the second group at 310, as illustrated in FIG. 9.

The first group of tiles, which includes the tile 218, 220, and the second group of tiles, which includes the tile 210 are exchanged by moving the first group of tiles from the middle row, from which the first group of tiles was selected, to the upper row, from which the second group of tiles was selected. The second group of tiles is moved from the upper row, from which the second group of tiles was selected, to the middle row, from which the first group of tiles was selected. Thus, the first group of tiles and the second group of tiles exchange rows.

The height of the upper row and the middle row and the row locations are reconfigured at 312 by identifying the largest or greatest of the minimum heights associated with the tiles of the upper row, which now includes the tiles 218, 220. The pixel height of the upper row is then set to the greatest minimum height associated with the tiles 218, 220, 212, 214. The height of the middle row is also reconfigured by identifying the largest of the minimum heights associated with the tiles of the lower row, which now includes the tile 210. The pixel height of the middle row is set to the greatest minimum height associated with the tiles 216, 210, 222, 224.

Although not shown, tiles may also be moved within a row. When a tile is moved within a row, the row height does not change. Thus, the height of the tiles in that row does not change.

In the examples described herein, the groups of tiles are selected based on touches on the touch-sensitive display. Multi-touch drag and drop gestures may also be utilized to select multiple tiles in each group. Alternatively, tiles may be selected utilizing a track pad, optical joystick, trackball, mouse, or other device to move a navigation indicator such as a cursor or highlighting on the display to select the groups of tiles.

Advantageously, the height of the rows is determined such that the row height is equal to the largest of the minimum pixel height of each of the tiles within that row. Each of the tiles is displayed at a height that is equal to the minimum pixel height of the tiles in the row such that all tiles in the row are displayed at the same height. Thus, the pixel height of tiles may change when the tiles are moved to different rows. Tiles may also be moved within a row. When tiles are moved from row to row, tiles are grouped such that groups of tiles of generally the same width exchange places. In addition, the row heights and locations and tile heights may change such that no large spaces are left between the tiles.

The scope of the claims should not be limited by the preferred embodiments set forth in the examples, but should be given the broadest interpretation consistent with the description as a whole.

What is claimed is:

1. A method of controlling display of information arranged in tiles on an electronic device, each tile having an associated minimum height for display such that a displayed height of each tile is equal to or greater than the associated minimum height, the method comprising:
   arranging, by the processor, the tiles in a plurality of rows on the display by setting a height of each row equal a largest minimum height associated with the tiles of that row and displaying each of the tiles in that row at a height that is equal to the greatest minimum height such that a tile is displayed at a height that is greater than the associated minimum height of that tile and all tiles in any one of the rows are displayed at a same height;
   receiving, from an input device in communication with the processor, a selection of a first group of tiles in a first row of the plurality of rows;
   receiving, from the input device, a selection of a second group of tiles in a second row of the plurality of rows;
   comparing, by the processor, a first group width with a second group width;
   in response to determining that the first group width is equal to the second group width, rearranging the tiles by:
      exchanging the first group of tiles with the second group of tiles by moving the first group of tiles to the second row and the second group of tiles to the first row; and
      determining a largest minimum height associated with the tiles in the first row, setting a new height of the first row to the largest minimum height associated with the tiles in the first row, and displaying each of the tiles in the first row at the largest minimum height associated with the tiles in the first row;
      determining a largest minimum height associated with the tiles in the second row, setting a new height of the second row to the largest minimum height associated with the tiles in the second row, and displaying each of the tiles in the second row at the largest minimum height associated with the tiles in the second row;
   in response to determining that the first group width differs from the second group width:
      automatically adding to one of the first group of tiles and the second group of tiles having a smaller width, an adjacent tile from an associated row; and
      repeating comparing, and, in response to determining that the width of the first group of tiles is equal to the width of the second group of tiles, rearranging the tiles.

2. The method according to claim 1, wherein rearranging the tiles comprises moving rows of tiles to accommodate changes in the height of the first row and the height of the second row.

3. The method according to claim 1, comprising, after automatically adding and repeating comparing, repeating automatically adding in response to determining that the first group width differs from the second group width.

4. The method according to claim 1, comprising repeating automatically adding and comparing until the first group width equals the second group width.

5. The method according to claim 1, wherein automatically adding comprises determining whether an additional tile is disposed immediately to the right of the group of tiles having a smaller width and, if so, adding the tile disposed immediately to the right.

6. The method according to claim 5, comprising adding a tile disposed immediately to the left of the group of tiles in response to determining that no additional tile is disposed immediately to the right.

7. The method according to claim 1, wherein the information comprises at least one of icons and widgets.

8. The method according to claim 1, wherein receiving the selection of the first group of tiles comprises receiving selection of a single tile in the first row.

9. The method according to claim 1, wherein receiving the selection of the second group of tiles comprises receiving selection of a single tile in the second row.

10. A non-transitory computer-readable storage medium having computer-readable code executable by at least one processor of the portable electronic device to perform the method according to claim 1.

11. An electronic device comprising:
a display for displaying information arranged in tiles, each tile having an associated minimum height for display such that a displayed height of each tile is equal to or greater than the associated minimum height;
an input device for selecting groups of tiles;
a processor coupled to the display and to the input device and programmed to:
arrange the tiles in a plurality of rows on the display by setting a height of each row equal a largest minimum height associated with the tiles of that row and displaying each of the tiles in that row at a height that is equal to the greatest minimum height such that a tile is displayed at a height that is greater than the associated minimum height of that tile and all tiles in any one of the rows are displayed at a same height;
receive, from the input device, a selection of a first group of tiles in a first row of the plurality of rows;
receive, from the input device, a selection of a second group of tiles in a second row of the plurality of rows;
compare a first group width with a second group width;
in response to determining that the first group width is equal to the second group width, rearrange the tiles by:
exchanging the first group of tiles with the second group of tiles by moving the first group of tiles to the second row and the second group of tiles to the first row; and
determining a largest minimum height associated with the tiles in the first row, setting a new height of the first row to the largest minimum height associated with the tiles in the first row, and displaying each of the tiles in the first row at the largest minimum height associated with the tiles in the first row;
determining a largest minimum height associated with the tiles in the second row, setting a new height of the second row to a largest minimum height associated with the tiles in the second row, and displaying each of the tiles in the second row at the largest minimum height associated with the tiles in the first row;
in response to determining that the first group width differs from the second group width:
automatically add to one of the first group of tiles and the second group of tiles having a smaller width, an adjacent tile from an associated row; and
repeat comparing, and, in response to determining that the width of the first group of tiles is equal to the width of the second group of tiles, rearranging the tiles.

12. The electronic device according to claim 11, wherein the display is part of a touch-sensitive display and the input device comprises touch sensors of the touch-sensitive display.

13. The electronic device according to claim 11, wherein other rows of tiles are moved to accommodate changes in the height of the first row and the height of the second row when the tiles are rearranged.

14. The electronic device according to claim 11, wherein the processor is programmed to repeatedly automatically add to one of the first group of tiles and the second group of tiles having the smaller width and compare until the first group width equals the second group width.

15. The electronic device according to claim 11, wherein the processor is programmed to determine whether an additional tile is disposed immediately to the right of the group of tiles having the smaller width and, if so, add the tile immediate to the right.

16. The electronic device according to claim 15, wherein the processor is programmed to add a tile disposed immediately to the left of the group of tiles having the smaller width in response to determining that no additional tile is disposed immediately to the right.

17. The electronic device according to claim 11, wherein the information comprises at least one of icons and widgets.

18. The electronic device according to claim 11, wherein the selection of the first group of tiles comprises selection of a single tile in the first row.

19. The electronic device according to claim 11, wherein the selection of the second group of tiles comprises selection of a single tile in the second row.

* * * * *